C. H. CONVERSE & W. H. C. RIDER.
PICTURE PROJECTING APPARATUS.
APPLICATION FILED MAR. 14, 1911.
1,062,081. Patented May 20, 1913.
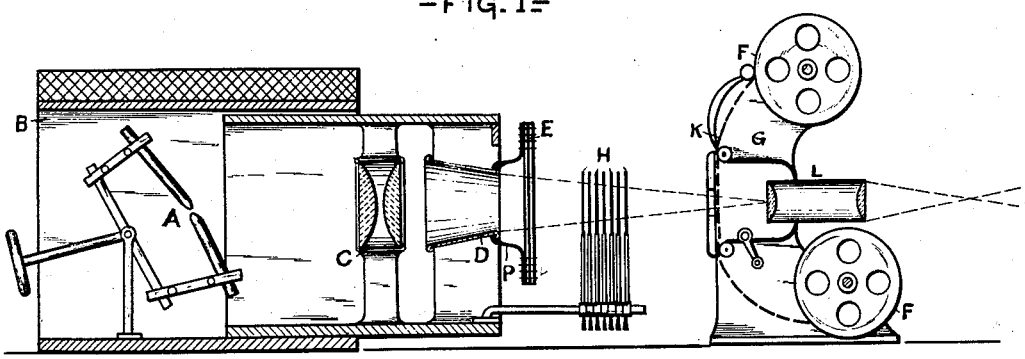
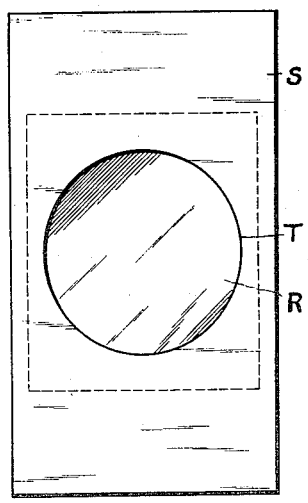
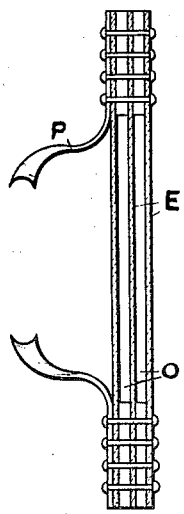
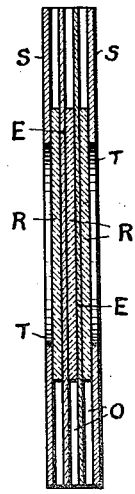
WITNESSES
INVENTORS
Charles H. Converse
William H. C. Rider
by Edward A. Wright Atty.

UNITED STATES PATENT OFFICE.

CHARLES H. CONVERSE AND WILLIAM H. C. RIDER, OF CHICAGO, ILLINOIS.

PICTURE-PROJECTING APPARATUS.

1,062,081. Specification of Letters Patent. Patented May 20, 1913.

Application filed March 14, 1911. Serial No. 614,388.

*To all whom it may concern:*

Be it known that we, CHARLES H. CONVERSE and WILLIAM H. C. RIDER, both citizens of the United States, residing at Chicago, in the county of Cook and State of Illinois, have invented a certain new and useful Improvement in Picture-Projecting Apparatus, of which the following is a specification.

This invention relates to picture projecting apparatus, and more particularly to apparatus for projecting moving pictures in which a gelatin-coated celluloid film is usually employed. This film is very inflammable, ordinarily igniting at a temperature of about 275 degrees F., and many disastrous fires have occurred from this cause.

One of the objects of our present invention is to provide an improved heat arresting or protecting screen between the light and the film of the picture apparatus, for the purpose of deflecting or absorbing the heat rays, or a sufficient amount of the heat from the light, as to prevent the temperature of the film from rising to a dangerous degree. We have discovered that by interposing a sheet or screen of celluloid between the arc light of the apparatus and the film, certain heat rays which would otherwise affect the celluloid film, are absorbed or arrested by the celluloid screen, so that the film is protected and remains at a safe degree of temperature.

Another object is to provide an improved heat arresting and color screen, through which the light may be projected to reproduce the pictures in various colors, tints, or shades, and according to this feature of our improvement, we employ colored celluloid sheets, the coloring being preferably applied as a coating of a gelatin solution of the desired tint, shade, or color.

In the accompanying drawing: Figure 1 is a diagrammatic elevation of a moving picture apparatus, with our improvements applied thereto; Fig. 2, a side or edge view, showing one form of heat arresting screen, upon a larger scale; Fig. 3, a front view of a slightly modified form of screen; and Fig. 4, a vertical section of the same.

According to the construction shown, the picture projecting apparatus comprises the usual lamp house B, containing arc light A, condensing lens C, and shaping tube D, while G represents the kinetoscope or moving picture machine, having film reels F, for carrying the film K, and the projecting lens L, all of which may be of the ordinary well known construction. As the condensing lens C, concentrates the rays of light to meet substantially at the focal point, at which the moving picture film is exposed, with an area of less than one square inch, it will be apparent that the heat rays will be concentrated upon this small area and that the temperature will therefore be very high at this point. In actual practice with the arc lights, as ordinarily used, this temperature is found to be about 320 degrees F., or more, and as the ordinary celluloid film ignites at a lower degree of temperature, it follows that there is great danger of the film taking fire, if it should remain stationary and exposed to this light for a short period of time, or even one or two seconds.

Various attempts have been made to apply a fireproofing material to the film, and different ingredients have been employed, such as cellulous acetate, which is not as inflammable as the gelatin coated celluloid film, but it is liable to blister, and deteriorates rapidly under the high temperature of the arc light of the machine.

According to one feature of our improvement, we interpose a sheet E, of transparent celluloid, cellulose, fibroid, or similar material, between the lamp and the film, thus absorbing the heat rays which affect such celluloid material, and rendering the use of the celluloid or similar film perfectly safe. This sheet of celluloid is preferably located near the point where the light emerges from the lens or shaping tube of the lamp house, at which point the circle of light is about three inches in diameter, covering an area of over six square inches, or many times greater than that at which the moving picture film is exposed. As the heat rays are thus spread over such a large area of the celluloid screen, the temperature of the screen at no time rises to a dangerous degree, even when exposed to the light continuously, consequently there is no danger of the screen taking fire, and the film which may be of the usual gelatin coated celluloid, or similar composition, is safely protected from the heat.

Either one or more sheets of the celluloid material may be used, and if desired, the celluloid sheet may be coated with a gelatin emulsion or solution, the principle of operation being that the celluloid and the gelatin of the screen arrest and absorb the heat rays which affect these materials, so that the film which is also composed of the same or similar materials is not materially affected in temperature as the light passes the film.

As will be readily understood by those familiar with the complex nature of light rays, certain specific heat rays which would affect the celluloid materials in the film, may thus be absorbed or filtered out by the interposed screen of similar celluloid materials, at the same time allowing the free passage of all light rays and concomitant heat not affecting such materials.

According to one construction, the celluloid screen E, may be composed of a plurality of thin sheets, of commercial celluloid, (either with or without the gelatin coating), rigidly connected together and separated by thin air spaces O, open at top and bottom, as shown more fully, in Fig. 2. This circulation of air further tends to cool the sheets and the use of a plurality of thin sheets offers less obstruction to the light than a single thick sheet.

For the purpose of assisting in the radiation of the heat from the surface of the celluloid sheets, additional sheets of glass or similar material may be inserted between the sheets of celluloid, and in contact therewith. The glass may also serve to intercept some of the heat rays of the light, but is mainly used to accelerate radiation and transmission of heat from the sheets of celluloid material which ordinarily conduct heat rather slowly from one exposed surface to another. Such a construction is illustrated in Figs. 3 and 4, in which alternate sheets of glass R, and the celluloid material E may be held in an aluminum casing S having openings T upon opposite sides for the passage of the light. The casing may be provided with open spaces at top and bottom and also upon its side edges, if desired, to permit the circulation of air through the spaces between the celluloid sheets.

It is understood that the terms "celluloid" and "celluloid material," as herein used, are not limited to the exact composition, but also include the various similar substances of this class, such as cellulose, fibroid, commercial celluloid, etc., which are known to be adapted for use in the manufacture of films for picture projecting apparatus.

Any desired means may be employed for supporting the heat arresting screen in position, such as the clamp P, for attachment to the shaping tube D, as indicated diagrammatically in Figs. 1 and 2.

According to another feature of our improvement, we provide a series of colored celluloid screens H, any one or more of which may be interposed in the projected light between the lamp and the film, for the purpose of protecting the film, and giving any desired color, tint, or shade to the picture. These screens may be colored by applying a coating of colored gelatin solution to each sheet of celluloid, and the series of sheets may then be adjustably supported in any suitable manner, so that any one or more of the screens may be adjusted into or out of the light rays, as desired.

Having now described our invention, what we claim as new, and desire to secure by Letters Patent, is:

1. In a picture projecting apparatus, the combination with the lamp, the condensing lens, and the film, of a heat arresting celluloid screen interposed between the lens and the film.

2. In a picture projecting apparatus, the combination with the lamp, the condensing lens, and the film, of a heat arresting celluloid sheet coated with a gelatinous solution interposed between the lens and the film.

3. In a picture projecting apparatus, the combination with a lamp, and a film of celluloid material, of a heat arresting screen of celluloid material interposed between the lamp and the film.

4. In a picture projecting apparatus, the combination with a lamp, and a film of inflammable material, of a heat resisting screen composed of like material and interposed between the lamp and the film.

5. In a picture projecting apparatus, the combination with a lamp, and a film, of a heat arresting screen composed of a plurality of sheets of celluloid material spaced apart, and interposed between the lamp and the film.

CHARLES H. CONVERSE.
WILLIAM H. C. RIDER.

Witnesses:
 THOMAS MUYATROYT,
 CHAS. G. LOW.